United States Patent
Moretti et al.

(10) Patent No.: US 9,651,066 B2
(45) Date of Patent: May 16, 2017

(54) TELESCOPIC ACTUATOR

(71) Applicant: MESSIER-BUGATTI-DOWTY, Velizy-Villacoublay (FR)

(72) Inventors: Nicolas Moretti, Velizy-Villacoublay (FR); Sébastien Meziane, Velizy-Villacoublay (FR); Gérard Balducci, Velizy-Villacoublay (FR)

(73) Assignee: MESSIER-BUGATTI-DOWTY, Vélizy-Villacoublay (FR)

( * ) Notice: Subject to any disclaimer, the term of this patent is extended or adjusted under 35 U.S.C. 154(b) by 447 days.

(21) Appl. No.: 14/483,890

(22) Filed: Sep. 11, 2014

(65) Prior Publication Data
US 2015/0075361 A1 Mar. 19, 2015

(30) Foreign Application Priority Data
Sep. 13, 2013 (FR) ...................... 13 58836

(51) Int. Cl.
*F16D 31/02* (2006.01)
*F15B 15/22* (2006.01)
*F16H 25/24* (2006.01)
*F16F 9/18* (2006.01)
*F16H 25/20* (2006.01)

(52) U.S. Cl.
CPC .............. *F15B 15/22* (2013.01); *F16F 9/182* (2013.01); *F16H 25/24* (2013.01); *F16H 25/20* (2013.01)

(58) Field of Classification Search
CPC .................................. F15B 15/22; F16F 9/182
USPC .......................................................... 60/413
See application file for complete search history.

(56) References Cited

U.S. PATENT DOCUMENTS

| 2009/0044645 | A1 | 2/2009 | Buescher | |
| 2012/0256146 | A1* | 10/2012 | Arnold | F16H 25/20 254/93 A |
| 2013/0133512 | A1 | 5/2013 | Mueller | |
| 2014/0137680 | A1* | 5/2014 | Leglize | B60G 15/12 74/89.32 |

FOREIGN PATENT DOCUMENTS

| DE | 10 2010 036 036 A1 | 3/2012 |
| EP | 2 025 852 A1 | 2/2009 |
| FR | 2 530 763 A1 | 1/1984 |
| WO | 2006/056039 A1 | 6/2006 |
| WO | 2011/130863 A2 | 10/2011 |

OTHER PUBLICATIONS

French Search Report for FR 13 58836, dated May 13, 2014.
Form FR 237 for FR 13 58836, dated Sep. 13, 2013.

* cited by examiner

*Primary Examiner* — Thomas E Lazo
*Assistant Examiner* — Daniel Collins
(74) *Attorney, Agent, or Firm* — Sughrue Mion, PLLC

(57) ABSTRACT

The invention relates to a telescopic actuator comprising a rod (4), a hollow lead screw (5), a fixed piston (9) comprising a first tail (10) which extends in the lead screw (5) and a head (11). According to the invention, the actuator comprises a first hydraulic connection channel (16) extending through the first tail (10) to fluidically connect a first chamber (C1) with a source of hydraulic fluid (17), and the channel (16) comprises first damping means suitable for slowing down the rod (4) when the latter is depressed by regulating a hydraulic fluid flow rate in the first channel provoked by the depression of the rod.

18 Claims, 2 Drawing Sheets

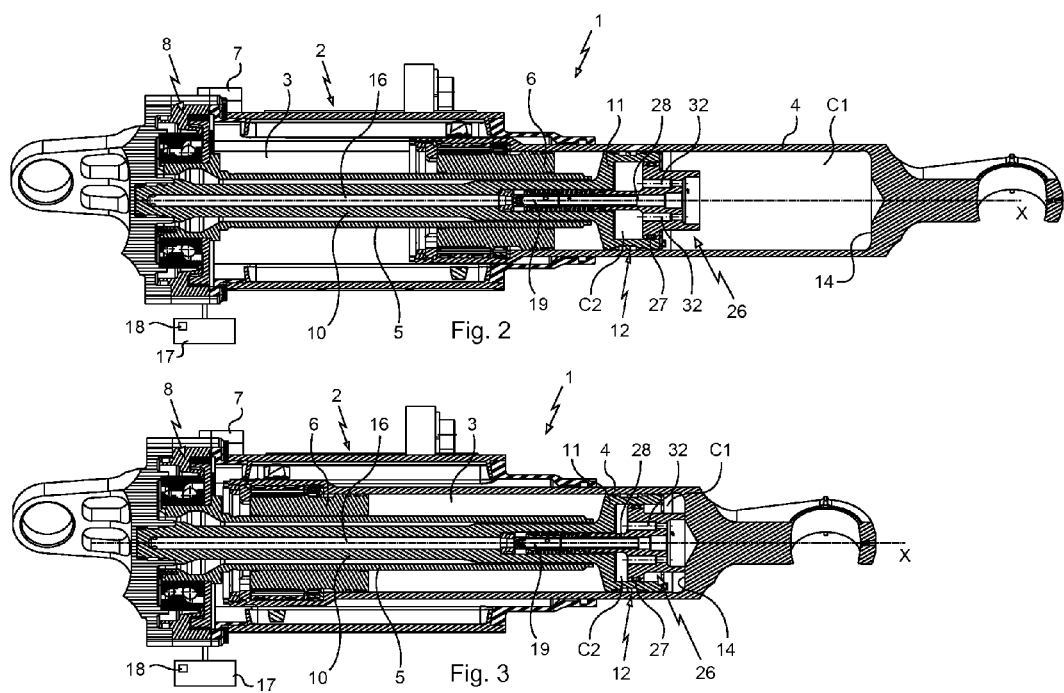

ained by a rotation of the lead screw 5 provokes an axial displacement of the rod 4 towards a so-called "extended" position that can be seen in FIG. 2, in which a depression of the rod 4 in the actuator body 2 is minimal, or towards a so-called "retracted" position that can be seen in FIG. 3, in which the depression of the rod 4 in the actuator body 2 is maximum.
TELESCOPIC ACTUATOR

CROSS-REFERENCE TO RELATED APPLICATION

This application relates to and claims the benefit of priority from French Patent Application No. 13 58836, filed on Sep. 13, 2013, the entire disclosure of which is incorporated herein by reference.

BACKGROUND OF THE INVENTION

Telescopic electromechanical actuators are known that comprise a body defining a cylindrical cavity and a rod mounted to slide telescopically in the cylindrical cavity, and comprising hydraulic damping means for damping a depression of the rod.

It is known practice, for producing these hydraulic damping means, to define, in the body of the actuator, a first sealed chamber extending in the hollow of the rod and a second sealed chamber extending in the rest of the rod and of the body, the two chambers containing a hydraulic fluid. The hydraulic damping is performed by the implementation of a lamination of the fluid on the outlet of the chamber from which the fluid is expelled.

The two sealed chambers are then linked to an accumulator provided with means for regulating the fluid intended to keep the fluid under pressure and also serving as a reserve of fluid.

In such an actuator, it is therefore necessary to provide the rod with a hydraulic coupling and to use a flexible pipe to link the rod to the accumulator, which presents a certain number of drawbacks, notably in terms of robustness, bulk, and the general weight of the actuator.

OBJECT OF THE INVENTION

The invention aims to design a telescopic actuator provided with hydraulic damping means which is more robust, less bulky and lighter than the known actuators of the same type.

SUMMARY OF THE INVENTION

In order to achieve this aim, a telescopic actuator is proposed comprising:
- an actuator body defining a first cylindrical cavity of longitudinal axis;
- a rod mounted to slide telescopically in the first cylindrical cavity along the longitudinal axis;
- a nut securely attached to the rod;
- a lead screw mounted in the first cylindrical cavity to extend and rotate on the longitudinal axis and cooperate with the nut such that a rotation of the lead screw results in a telescopic displacement of the rod in the first cylindrical cavity;
- means for driving the lead screw in rotation;
- a fixed piston comprising a first tail which extends in the lead screw and a piston head, said piston head cooperating in a seal-tight manner with an internal wall of the rod to define, between the head and a bottom of the rod, a first chamber of variable volume upon the displacement of the rod. According to the invention, the actuator comprises a first hydraulic connection channel extending through the first tail to fluidically connect the first chamber with a source of hydraulic fluid, and the channel comprises first damping means suitable for slowing down the rod when the latter is depressed by regulating a hydraulic fluid flow rate in the first channel provoked by the depression of the rod.

Thus, an intake and a discharging of the hydraulic fluid in the first chamber are performed through the connection channel and do not therefore require the sliding rod of the actuator to be linked to an accumulator: the use of a flexible pipe extending out of the actuator is therefore no longer required, which makes it possible to improve the robustness of the actuator and to reduce its bulk and its weight. Furthermore, in the actuator of the invention, only the first chamber is filled with hydraulic fluid. The rest of the actuator therefore does not contain any hydraulic fluid, which further reduces the weight of said actuator.

BRIEF DESCRIPTION OF THE DRAWINGS

The invention will be better understood in light of the following description, with reference to the figures of the attached drawings in which:
FIG. 2 is a cross-sectional view of the telescopic actuator of the invention when the rod is in an extended position;
FIG. 3 is a cross-sectional view of the telescopic actuator of the invention when the rod is in a retracted position.

DETAILED DESCRIPTION OF THE INVENTION

Figure 1:
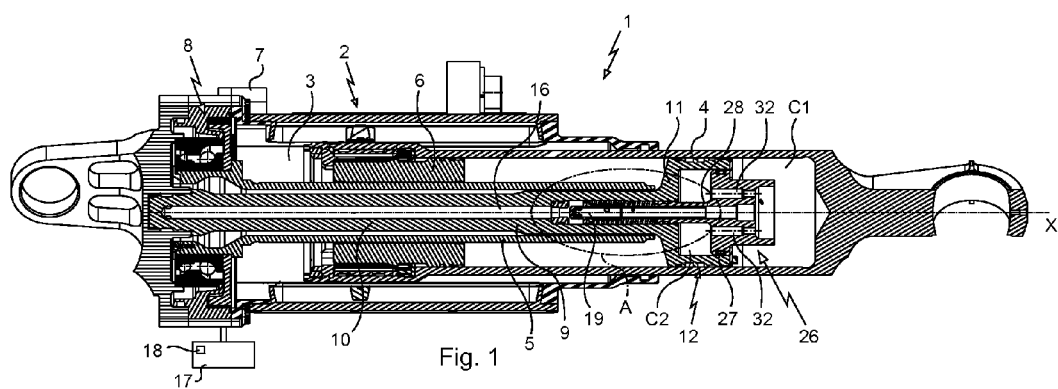
FIG. 1 is a cross-sectional view of a telescopic actuator of the invention whose rod is in an intermediate position.
Figure 1A:
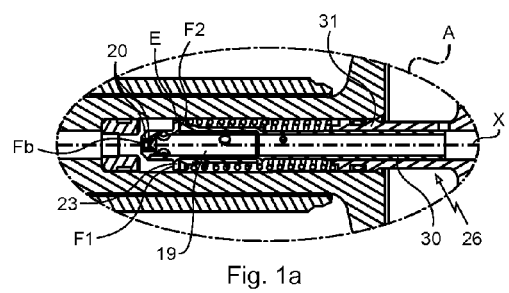
FIG. 1a represents a local enlargement of FIG. 1.

Referring to FIGS. 1 to 3, the telescopic actuator 1 of the invention comprises an actuator body 2 defining a first cylindrical cavity 3 of longitudinal axis X in which a rod 4 is mounted to slide telescopically along the longitudinal axis X. Anti-rotation means prevent the rod from pivoting relative to the actuator body 2.

A hollow lead screw 5 extends along the axis X inside the first cylindrical cavity 3 and is mounted to rotate on the axis X. The lead screw 5 is threaded externally to cooperate with a nut 6 securely attached to the rod 4. Thus, a rotation of the lead screw 5 provokes an axial displacement of the rod 4 towards a so-called "extended" position that can be seen in FIG. 2, in which a depression of the rod 4 in the actuator body 2 is minimal, or towards a so-called "retracted" position that can be seen in FIG. 3, in which the depression of the rod 4 in the actuator body 2 is maximum.

The driving of the lead screw 5 in rotation is here ensured by means of an electric motor 7 which drives, via a reduction gear 8, a drive shaft having a splined end cooperating with matching splines of the lead screw. The motor could also be a hydraulic motor.

The actuator comprises a fixed piston 9 comprising a first tail 10 fixed to a bottom of the actuator body 2 and a piston head 11. The first tail 10 extends inside the lead screw 5 along the axis X. The head 11 cooperates in a seal-tight manner with an internal wall of the rod 4 by virtue of seals 12. The head 11 of the fixed piston 9 thus defines, between a bottom 14 of the rod 4 and the head 11, a first chamber C1 of variable volume upon the displacement of the rod 4. The volume of the first chamber C1 is thus maximum when the rod 4 is in the extended position and minimum when the rod 4 is in the retracted position.

In the actuator 1 of the invention, a first hydraulic connecting channel 16 extends through the first tail 10 to fluidically connect the first chamber C1 with a source of hydraulic fluid, in this case, with a hydraulic accumulator 17. The hydraulic accumulator 17, schematically represented in FIGS. 1 to 3, comprises means 18 for pressurizing the hydraulic fluid, said pressurizing means comprising, for example, a flexible membrane on which a constant quantity of gas acts. The purpose of the pressurizing means 18 is to keep the hydraulic fluid pressurized in the first chamber C1 and in the first connecting channel 16, which makes it possible to avoid any cavitation. The accumulator 17 also serves as a reserve of fluid.

The first connecting channel 16 comprises first damping means suitable for slowing down the rod 4 upon a depression thereof by regulating a hydraulic fluid flow rate in the first channel 16 provoked by the depression of the rod 4: the first damping means are therefore active when the rod passes from the extended position to the retracted position.

The first damping means here comprise restriction means suitable for laminating the hydraulic fluid when the latter is discharged from the first chamber C1 when the rod 4 is depressed in the actuator body 2. The hydraulic fluid is therefore laminated in its passage from the first chamber C1 to the accumulator 17 via the first connecting channel 16.

The restriction means comprise a check valve 19 arranged in the first channel 16, the function of which is, on the one hand, to laminate the hydraulic fluid when the rod 4 is retracted, and, on the other hand, to open to allow the hydraulic fluid to pass with the least possible head losses when the rod 4 is extended.

To ensure the lamination of the hydraulic fluid, the check valve 19 comprises two gauged holes 20, through which the hydraulic fluid is made to flow when the rod 4 is depressed.

The check valve 19 is, furthermore, adapted to open to admit fluid into the first chamber C1 when the rod 4 is extended. An overpressure on the blocking face Fb of the check valve exerted by the hydraulic fluid running in the first connecting channel 16 from the accumulator 17 to the first chamber C1 pushes back the check valve 19 and allows for the intake of the fluid with a minimum of head loss, to avoid any cavitation in the connecting channel 16 when the rod 4 is extended.

A spring 25 extends in the connecting channel 16 and comprises an end pressed onto the collar 23 of the check valve 19. The spring 25 is compressed when the overpressure occurs upon the intake of the fluid into the first chamber C1 provoking the opening of the check valve 19, and reverts to its normal position when the overpressure disappears, which returns the check valve 19 to the position in which it blocks the first connecting channel 16.

Furthermore, it will be noted that the spring 25 is calibrated to hold the check valve in the closed position in the event of vibration of the actuator.

In addition to the first damping means, the actuator of the invention comprises second means for damping the rod 4 suitable for slowing down the rod 4 at the end of depression.

The second damping means comprise a sliding piston 26 cooperating in a seal-tight manner with an internal wall of the head 11 of the fixed piston 9. The sliding piston 26 is equipped with a seal 27 to ensure this seal-tightness. The sliding piston 26 thus defines, between the head 11 and the bottom of the sliding piston 26, a second chamber C2.

The sliding piston 26 is arranged in such a way that, at the end of travel, the bottom of the rod 4 abuts against the sliding piston 26 forcing the latter to be depressed in the head 11 of the fixed piston 9 and thus provoking the discharging of the hydraulic fluid from the second chamber C2. This discharging of the fluid is performed through a second connecting channel 28 formed in the sliding piston 26, which fluidically connects the second chamber C2 with the first connecting channel 16. The volume of the second chamber C2 is thus permanently maximum except when the rod 4 arrives at the end of travel and abuts against the sliding piston 26. The volume of the second chamber is then reduced until the rod 4 arrives in the retracted position, in which the volume of the second chamber C2 is minimum.

The second damping means comprise means for progressively blocking the second channel 28 during the depression of the sliding piston 26 in the head 11 of the fixed piston 9, said progressive blocking means comprising, in this case, a jacket 30 extending in a second tail 31 of the sliding piston 26 into which the channel 28 emerges. Thus, when the second channel 28 is blocked, the hydraulic fluid contained in the second chamber C2 can no longer be discharged therefrom other than by an annular gap between the second tail 31, the sliding piston 26 and the jacket 30, thus making it possible to slow down the depression of the sliding piston 26 at the end of travel.

The jacket 30 is here securely attached to the check valve 19, which is pressed onto the jacket 30. The jacket 30 is fitted with a small gap with the internal wall of the second tail 31 of the sliding piston 26, which makes it possible to keep it in a lateral position while allowing it to slide in the second tail 31 of the sliding piston 26 upon the opening and closure of the check valve 19. The jacket 31 progressively obstructs the second channel 28 when the piston 26 is depressed in the head 11 of the fixed piston 9.

Thus, when the rod 4 is in the retracted position, the second chamber C2 is emptied of some of the hydraulic fluid which normally fills it. In order to allow for the second chamber C2 to be filled so that the second chamber C2 can fulfil its damping function, the piston comprises at least one ball valve 32, in this case two ball valves 32, adapted to open to admit fluid into the second chamber C2 when the rod 4 is extended.

There now follows a description of the operation of the actuator 1 of the invention, and in particular of how the damping means operate when the rod 4 is depressed or extended.

When the rod 4 is depressed, the bottom 14 of the rod 4 pushes back the hydraulic fluid contained in the first chamber C1 in the first connecting channel 16. The hydraulic fluid flows through two gauged orifices 20 of the check valve 19, runs in the first connecting channel 16 towards the accumulator 17, and fills the accumulator. When it flows through the two gauged orifices 20, the fluid is laminated, which reduces its flow rate, and therefore slows down the rod 4 and makes it possible to manage the speed of depression.

When the rod 4 arrives at the end of depression, it abuts against the sliding piston 26 which slides towards the bottom of the head 11 of the fixed piston 9. The hydraulic fluid contained in the second chamber C2 opposes the sliding of the piston 26, which slows down the rod 4 which is therefore damped at the end of depression. The hydraulic fluid is discharged from the second chamber C2 via the second connecting channel 28 until the second connecting channel 28 is blocked by the jacket 31. Once the connecting channel 28 is blocked, the hydraulic fluid flows towards the connecting channel 16 via the annular gap between the jacket 30 and the second tail 31 of the sliding piston 26 until the rod 4 is completely stopped.

When the rod 4 is extended, the volume of the first chamber C1 increases and the pressurizing means 18 of the hydraulic accumulator 17 act to fill the first chamber C1 with hydraulic fluid. The hydraulic fluid then runs through the connecting channel 16, pushes back the check valve 19 and fills the first chamber C1 which makes it possible to reactivate the first damping means. For its part, the second chamber C2 is filled with hydraulic fluid which is admitted into the second chamber C2 through ball valves 32, which makes it possible to reactivate the second damping means. In filling the second chamber C2, the hydraulic fluid pushes back the sliding piston 26 against a washer 33 securely attached to the head 11 of the fixed piston 9, the sliding piston 26 being held in a position in which the second chamber C2 has a maximum volume.

It is interesting to note finally that the damping in retraction implemented by the telescopic actuator of the invention is available whether the actuator is active or not.

The invention is not limited to the particular embodiment which has just been described, but, quite to the contrary, encompasses any variant falling within the framework of the invention as defined by the claims.

The invention claimed is:

1. Telescopic actuator comprising:
   an actuator body (2) defining a first cylindrical cavity (3) of longitudinal axis (X);
   a rod (4) mounted to slide telescopically in the first cylindrical cavity (3) along the longitudinal axis (X);
   a nut (6) securely attached to the rod (4);
   a hollow lead screw (5) mounted in the first cylindrical cavity (3) to extend and rotate on the longitudinal axis (X) and cooperate with the nut (6) such that a rotation of the lead screw (5) results in a telescopic displacement of the rod (4) in the first cylindrical cavity (3);
   means for driving the lead screw in rotation;
   a fixed piston (9) comprising a first tail (10) which extends in the lead screw (5) and a piston head (11), said piston head (11) cooperating in a seal-tight manner with an internal wall of the rod to define, between the head and a bottom of the rod, a first chamber (C1) of variable volume upon the displacement of the rod;
   characterized in that the actuator comprises a first hydraulic connection channel (16) extending through the first tail (10) to fluidically connect the first chamber (C1) with a source of hydraulic fluid (17), and in that the channel (16) comprises first damping means suitable for slowing down the rod (4) when the latter is depressed by regulating a hydraulic fluid flow rate in the first channel provoked by the depression of the rod.

2. Telescopic actuator according to claim 1, in which the first damping means comprise restriction means suitable for laminating the hydraulic fluid when the latter is discharged from the first chamber when the rod is depressed in the body.

3. Telescopic actuator according to claim 2, in which the restriction means comprise a check valve (19) arranged in the first channel to block the latter and to open in response to an overpressure in the first chamber when the rod (4) is depressed.

4. Telescopic actuator according to claim 3, in which the check valve is calibrated and adapted to open to admit fluid into the first chamber when the rod (4) is extended.

5. Telescopic actuator according to claim 1, further comprising second means for damping the rod (4) suitable for slowing down the rod (4) at the end of depression.

6. Telescopic actuator according to claim 5, in which the second damping means comprise a sliding piston (26) cooperating in a seal-tight manner with an internal wall of the head (11) of the fixed piston (9) to define, between the head (11) and the bottom of the sliding piston (26), a second chamber (C2), a second connecting channel (28) being formed in the sliding piston (26) to fluidically connect the second chamber (C2) with the first connecting channel (16), the sliding piston (26) being arranged in such a way that, at the end of travel, the bottom of the rod abuts against the sliding piston forcing the latter to be depressed into the head (11) and thus resulting in the discharging of the hydraulic fluid contained in the second chamber via the second connecting channel.

7. Telescopic actuator according to claim 6, in which the second damping means comprise means (30) for progressively blocking the second channel during the depression of the sliding piston in the head (11).

8. Telescopic actuator according to claim 7, in which the progressive blocking means comprise a jacket (30) fitted with little play against an internal wall of a second tail (31) of the sliding piston (26) into which the second channel emerges, the jacket (30) progressively obstructing the second channel when the sliding piston is depressed in the head (11).

9. Telescopic actuator according to claim 7, in which the sliding piston (26) comprises at least one ball valve (32) adapted to open to admit fluid into the second chamber when the rod is extended.

10. Telescopic actuator according to claim 2, further comprising second means for damping the rod (4) suitable for slowing down the rod (4) at the end of depression.

11. Telescopic actuator according to claim 3, further comprising second means for damping the rod (4) suitable for slowing down the rod (4) at the end of depression.

12. Telescopic actuator according to claim 4, further comprising second means for damping the rod (4) suitable for slowing down the rod (4) at the end of depression.

13. Telescopic actuator according to claim 10, in which the second damping means comprise a sliding piston (26) cooperating in a seal-tight manner with an internal wall of the head (11) of the fixed piston (9) to define, between the head (11) and the bottom of the sliding piston (26), a second chamber (C2), a second connecting channel (28) being formed in the sliding piston (26) to fluidically connect the second chamber (C2) with the first connecting channel (16), the sliding piston (26) being arranged in such a way that, at the end of travel, the bottom of the rod abuts against the sliding piston forcing the latter to be depressed into the head (11) and thus resulting in the discharging of the hydraulic fluid contained in the second chamber via the second connecting channel.

14. Telescopic actuator according to claim 11, in which the second damping means comprise a sliding piston (26) cooperating in a seal-tight manner with an internal wall of the head (11) of the fixed piston (9) to define, between the head (11) and the bottom of the sliding piston (26), a second chamber (C2), a second connecting channel (28) being formed in the sliding piston (26) to fluidically connect the second chamber (C2) with the first connecting channel (16), the sliding piston (26) being arranged in such a way that, at the end of travel, the bottom of the rod abuts against the sliding piston forcing the latter to be depressed into the head (11) and thus resulting in the discharging of the hydraulic fluid contained in the second chamber via the second connecting channel.

15. Telescopic actuator according to claim 12, in which the second damping means comprise a sliding piston (26) cooperating in a seal-tight manner with an internal wall of the head (11) of the fixed piston (9) to define, between the head (11) and the bottom of the sliding piston (26), a second chamber (C2), a second connecting channel (28) being formed in the sliding piston (26) to fluidically connect the second chamber (C2) with the first connecting channel (16), the sliding piston (26) being arranged in such a way that, at the end of travel, the bottom of the rod abuts against the sliding piston forcing the latter to be depressed into the head (11) and thus resulting in the discharging of the hydraulic fluid contained in the second chamber via the second connecting channel.

16. Telescopic actuator according to claim 13, in which the second damping means comprise means (30) for progressively blocking the second channel during the depression of the sliding piston in the head (11).

17. Telescopic actuator according to claim 14, in which the second damping means comprise means (30) for progressively blocking the second channel during the depression of the sliding piston in the head (11).

18. Telescopic actuator according to claim 15, in which the second damping means comprise means (30) for progressively blocking the second channel during the depression of the sliding piston in the head (11).

* * * * *